(12) United States Patent
Schulz et al.

(10) Patent No.: US 11,650,574 B2
(45) Date of Patent: May 16, 2023

(54) CUSTOM LOGIC ENGINEERING OF AN INDUSTRIAL MODULAR PLANT

(71) Applicant: ABB Schweiz AG, Baden (CH)

(72) Inventors: Dirk Schulz, Meckenheim (DE); Katharina Stark, Weinheim (DE); Mario Hoernicke, Landau (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/559,014

(22) Filed: Dec. 22, 2021

(65) Prior Publication Data

US 2022/0197253 A1   Jun. 23, 2022

(30) Foreign Application Priority Data

Dec. 23, 2020   (EP) .................................. 20217001

(51) Int. Cl.
*G05B 19/4155* (2006.01)

(52) U.S. Cl.
CPC ............. *G05B 19/4155* (2013.01); *G05B 2219/31372* (2013.01)

(58) Field of Classification Search
None
See application file for complete search history.

(56) References Cited

U.S. PATENT DOCUMENTS

2019/0041831 A1   2/2019   Albers et al.

FOREIGN PATENT DOCUMENTS

| EP | 3696738 A1 | 8/2020 |
|----|------------|--------|
| EP | 3705963 A1 | 9/2020 |
| WO | WO 2010/037145 A2 | 4/2010 |

OTHER PUBLICATIONS

European Patent Office, Extended European Search Report in European Patent Application No. 20217001.5, 8 pp. (dated May 12, 2021).

*Primary Examiner* — Ryan A Jarrett

(74) *Attorney, Agent, or Firm* — Leydig, Voit & Mayer, Ltd.

(57) ABSTRACT

A method for custom logic engineering in an industrial modular plant executing a production process includes receiving process data for the production process using at least one physical process module; determining a custom process topology by selecting, based on the received process data, at least one module type package, MTP; correlating to the at least one respective physical process module from a database, wherein the module type package is a digital representation of the respective physical process module; selecting at least one extender unit from the database based on the received process data; representing a logical function of the production process; determining connections between the extender unit(s) and the at least one MTP; setting properties of the extender unit(s) based on the received process data; and determining an extended control scheme for controlling dynamic behavior of the production process using the determined custom process topology.

18 Claims, 2 Drawing Sheets

CUSTOM LOGIC ENGINEERING OF AN INDUSTRIAL MODULAR PLANT

CROSS-REFERENCE TO RELATED APPLICATIONS

Figure 1:
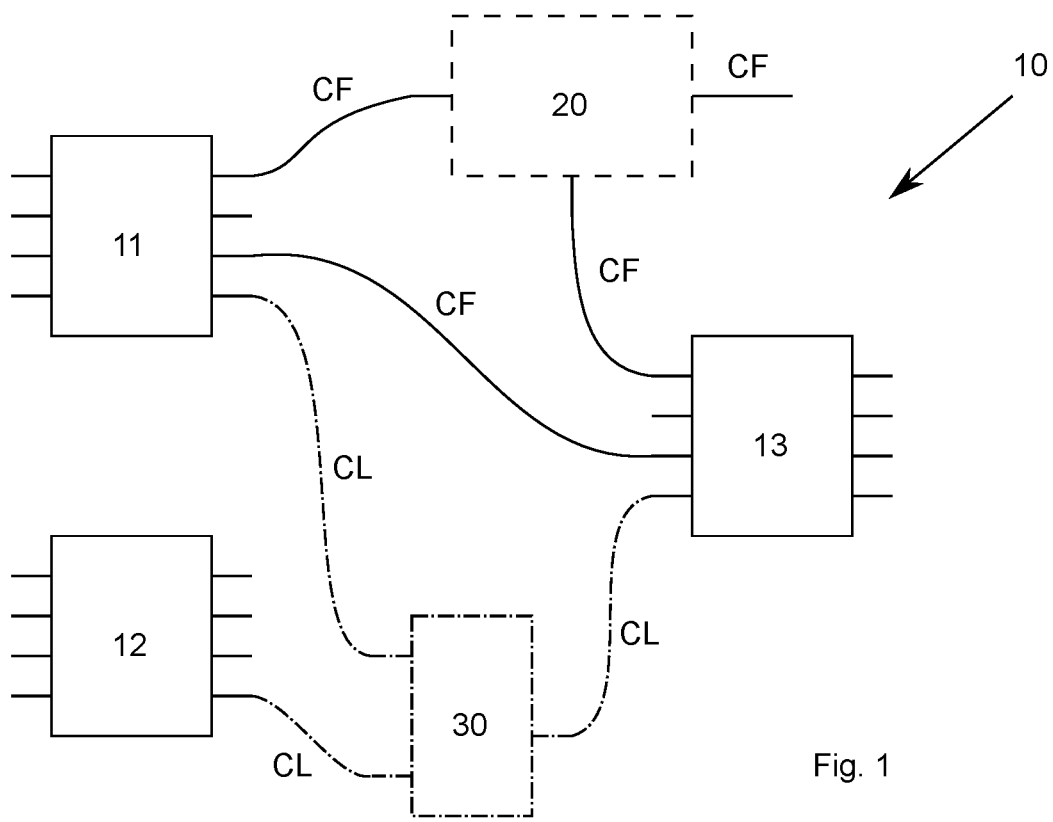

The present application claims the benefit of European Patent (EP) Application Ser. No. EP 20 217 001.5, filed on Dec. 23, 2020, which is incorporated herein in its entirety by this reference for all purposes.

FIELD OF THE DISCLOSURE

The invention relates to the field of engineering an industrial modular plant.

BACKGROUND OF THE DISCLOSURE

Today, a modular plant is engineered on two levels. First, the process topology representing the required process equipment and material flow is created by instantiating and connecting module representations derived from modular type package, MTPs. Then, a process orchestration layer, POL, is designed to control the dynamic behavior of the process which transforms and transports the material through the individual process steps. This approach, while reducing engineering complexity, at the same time limits the integration depth and fidelity of a process model. Properties of the plant topography like actual pipe lengths or diameters cannot be considered. Units or range differences between connected modules cannot be converted within the confines of the modular automation standard. User-friendly or proven design approaches for the POL such as sequential function charts, SFCs, cannot be used for high complexity process recipes. Using full-fledged IEC 61131 programming to design the POL would defeat the purpose of simplicity and speed for modular automation. BACKGROUND

SUMMARY OF THE DISCLOSURE

It is therefore an aspect of the present disclosure to provide an improved method of engineering of an industrial modular plant overcoming the described limitations. This objective is achieved by the subject-matter of the independent claims. Further preferred embodiments are evident from the dependent patent claims.

In an embodiment in accordance with the disclosure, a method for custom logic engineering in an industrial modular plant executing a production process, comprises the following steps. In a first step, process data for the production process using at least one physical process module is received. In a second step, a custom process topology is determined by selecting, based on the received process data, at least one module type package, MTP, correlating to the at least one respective physical process module from a database, wherein the module type package is a digital representation, or in other words a digital twin, of the respective physical process module, selecting at least one extender unit from the database based on the received process data, representing a logical function of the production process, determining connections between the at least one extender unit and the at least one MTP, and setting properties of the at least one extender unit based on the received process data. In a third step, an extended control scheme for controlling dynamic behaviour of the production process is determined using the determined custom process topology.

The custom process topology represents required process equipment, for example, the physical modules, and material flow is created by instantiating and connecting module representations derived from modular type package, MTPs, and in addition from extender units. Then, a process orchestration layer, POL, is configured to control the dynamic behaviour of the production process, which transforms and transports the material through the individual process steps based on the custom process topology. In a modular engineering tool, the custom process topology is represented by a sheet, on which the different MTPs, or process modules, and in addition the different extender units are arranged and interconnected to model or represent the production process.

The term "extended control," as used herein, represents process data of the production process that is not represented by the MTPs in a process topology. In the custom process topology, the process data represented by the MTPs is extended by additional process data represented by the extender units. The extended control preferably comprises a relationship between different materials and/or physical modules that cannot be modelled or represented by the known MTPs.

The term "production process," as used herein, describes processing at least one starting material to provide an end material. This production process usually comprises, steps like mixing, heating, cooling, pressurizing and/or storing different materials or intermediate products.

The term "process data," as used herein, relates to information about the production process to be executed by the industrial modular plant. Preferably, the process data is referred to as process recipe. The process data is the basis of designing and/or controlling the production process, in particular used by an automated system and/or a modular engineer.

The extender unit in other words extends the representation of the production process on a topological layer, in particular by data or control code.

In an example, the extender unit extends functions of an MTP that have not been or could not have been integrated into the MTP. Preferably, the logical function extender is represented as an element in the custom process topology that is loaded into a modular engineering tool, for example used by the modular engineer, similar to the MTP.

Preferably, the modular type package, MTP, may relate to a virtual model of a physical process module. The MTP is thus also referred to as process module. The modular type package contains all necessary information to integrate a module into a modular plant, such as the communication, the services, a human machine interface, HMI, description and the maintenance information. In other words, the MTP represents a description of physical process module based on which the digital representation of the physical process module can be instantiated.

Preferably, the logical function of the production process may be instantiated by the extender unit based on existing function libraries, in particular within a distributed control system, DCS.

In other words, the custom process topology relates to a combined plant topology, combining physical process modules, or in other words equipment topology, and logical functions. Thus, the logical functions are added to the modular engineering based on MTPs on top of the equipment topology.

Preferably, the method may be a computer-implemented method.

Preferably, the steps of selecting the MTP and/or the extender unit may comprise automatically instantiating of the MTP/extender unit, in particular based on the process data, and selecting of the MTP/extender unit automatically and/or by an modular engineer based on the process data.

Preferably, the method may be used in a modular engineering tool, or in other words an orchestration designer planning and engineering tool, configured for realizing complex orchestration schemes without control code programming. Thus, the digital representations can be handled efficiently.

Preferably, the MTPs and the extender units may be known assets, in particular to the modular engineering tool.

Preferably, a distributed control system, DCS, engineering project may be set up to host a control scheme implementation of the modular industrial plant. In other words, the method is used in a modular automation engineering project controlling the production process.

Preferably, the set properties of the at least one extender unit may be added to a control code library of the DCS for future setting of properties of the at least one extender unit.

Preferably, all services and signals from the custom process topology may also be available to the process.

Thus, the signals and services from the MTPs and extender units are connected seamlessly during the method for custom logic engineering of an industrial modular plant.

Thus, design problems can be solved on process topology layer. In other words, logical functions, as for example a unit conversion, can be directly used and configured, in particular without programming, from within a process topology editor of the modular engineering tool.

Preferably, setting properties of the at least one extender unit may comprise determining a parametrization for the at least one extender unit.

The term "parametrization," as used herein, relates to adjustable settings that the extender unit provides. Those settings may be adjusted based on the process data. This allows designing templates of different extender units that can be parameterized according to the process data. For example, there is an extender unit for a T-section of a pipe. The different length of the pipes in the T-section is however adjustable by parametrizing the extender unit. Thus, in the custom process topology, a generic extender unit for a T-section can be introduced, wherein the extender unit is setup based on the process data by parametrization.

Consequently, this allows for a simple and fast representation of a complex production process in a modular engineering tool.

Consequently, an improved method for custom logic engineering in an industrial modular plant is provided.

Preferably, a user, in particular a process expert, may be able to use the described method in the same natural way that is standardized by modular engineering because all extensions, despite being only logical functions, handle like MTPs. This allows the user to achieve a higher proficiency.

The method consequently allows for realizing complex orchestration schemes without control code programming, enabling customers to produce more complex or demanding process recipes simply by extending the process topology in a natural manner. This allows for extending the coverage of modular automation without breaking the simplicity of modular engineering concepts.

In other words, the general design principles of modular engineering, in particular using configurable modules instead of common monolithic engineering, are applied. In other words, the extender unit are applicable within the modular automation standard, for example VDI 2658, and thus in custom logic engineering in an industrial modular plant.

Consequently, an improved method for custom logic engineering in an industrial modular plant may be provided.

In a preferred embodiment, the at least one extender unit comprises at least one virtual module type package, vMTP, modelling dynamic properties of multi-point material flow through passive equipment.

Preferably, the passive equipment may comprise pipes, connecting the physical modules of the industrial modular plant and transporting material.

Preferably, in the custom process topology, the vMTP is represented as a box that behaves like an MTP. The vMTP provides material inputs and material outputs as well as signals, like control signals or trigger signals. The vMTP can be parameterized in order to adjust the behaviour of the vMTP in the custom process topology in line with intents of the plant topology engineering, or in other words, in line with the process data.

Consequently, the extender unit provides a parameterizable model, modelling additional functions of the production process, in particular used in the custom process topology.

Consequently, an improved method for custom logic engineering in an industrial modular plant is provided.

In a preferred embodiment, the at least one extender unit comprises at least one dedicated logic function.

Preferably, the dedicated logic function may be configured for performing, doing or executing any algorithmic calculation. As an example, the dedicated logic function provides logic AND of two Boolean signals, comparing the actual level of a tank to a reference level to create a Boolean signal that can be used as trigger in the POL. In another example, the dedicated logic function provides logic AND/OR between modules to realize interlocks between modules, e.g. a reactor-module is only allowed to pump through the next two parallel filtration modules of both or one of them is ready. In another example, the dedicated logic function provides a conversion-block to connect two temperature-values between modules where one is in ° C. and the one in K. In another example, the dedicated logic function provides a PID-controller to control a temperature in a reactor-module by switching a simple heating-module on/off or setting some value, in particular in case no PID-controller is available in the modules itself.

In the custom process topology, lines only transport signals and states, but boxes representing the dedicated logic function can be parameterized.

Consequently, the extender unit provides a parameterizable model, modelling additional functions of the production process, in particular used in the custom process topology.

Consequently, an improved method for custom logic engineering in an industrial modular plant is provided.

In a preferred embodiment, the at least one logic function may comprise logical gate functions and/or unit conversion.

Preferably, the logical gate functions includes the functions of logic gates, like AND, OR, XOR etc.

In a preferred embodiment, the at least one extender unit may comprise at least one smart connector, modelling dynamic properties of material flow. The at least one smart connector is used for the connections between the at least one vMTP and the at least one MTP.

For example, the smart connector models a transport delay of a fluid based on a pipe length. Annotating smart connectors with properties of the physical pipe such as length or diameter allows the calculation of amount of material flow, flow delay, expected pressure within the pipe based on output flow of the material-providing module, or flow within the pipe based on output pressure of the material-providing process module.

In the custom process topology, the smart connectors represent material flow. The smart connectors also can be parameterized or may provide signals. For example, the smart connector sets parameters for other extender units, like vMTPS.

Consequently, the extender unit provides a parameterizable model, modelling additional functions of the production process, in particular used in the custom process topology.

Consequently, an improved method for custom logic engineering in an industrial modular plant is provided.

In a preferred embodiment, the at least one extender unit may be visualized and represented, in particular in engineering data, like the at least one MTP when determining the extended control scheme.

Extender units may offer services, material flow connections, and I/O signals like any process module representing a physical module.

Consequently, the extender unit provides a parameterizable model, modelling additional functions of the production process that behaves in the custom process topology and/or the POL like an MTP.

Consequently, an improved method for custom logic engineering in an industrial modular plant is provided.

In a preferred embodiment, the extended control scheme may be determined in a process orchestration layer, POL, making the extended control of the production process visible.

In other words, the properties, e.g., configuration, services and/or states, of the extender units will be visible on the POL layer, as long as they are compliant with the MTPs. This allows for an extended control on the POL as additional features on the POL layer are added. The POL itself is however not changed when introducing the extender unit.

Preferably, the POL may be a layer on top of the custom process topology

Preferably, determining the extended control scheme may comprise creating an extended POL code in the DCS.

In the POL, the extender units provide signals, like input triggers, states and services.

In a preferred embodiment, the method may comprise the step: Implementing the control scheme, in particular on the POL, using a sequential flow chart, SFC.

Providing extender units, as described, usable in the custom process topology, allows for using a relatively simple SFC in the POL. Thus, a relatively complex production process can be modelled and controlled without significantly raising the complexity of the task.

Furthermore, in general an SFC cannot provide real-time processing. Thus, continuous logic or control cannot be represented by an SFC. The extender unit allows representing interlocks between MTPs and the SFC. Furthermore, the extender unit allows realizing fast reacting triggers that cannot be represented by a comparably slow SFC. Consequently, using the extender unit, real-time processing can be realized using an SFC.

In a preferred embodiment, the method may comprise the step: Operation of the modular plant using the control scheme.

Preferably, the extended POL code is compiled and downloaded for operation of the industrial modular plant.

In a preferred embodiment, determining at least one extender unit, comprises loading the at least one extender unit from a library and/or derive the at least one extender unit from model data, in particular CAD-data.

Due to the possibility of parametrization of the extender unit, a generic extender unit may be already stored in a library and just selected from there by the automated system or modular engineer. Alternatively, the extender unit also may be directly determined based on model data, in particular provided by the process data.

Preferably, the library may be loaded by the DCS into the modular engineering tool, in particular available for the custom process topology and the POL to make the extender unit types available alongside the MTPs.

In a preferred embodiment, determining the at least one extender unit may comprise extracting the at least one extender unit from a process flow diagram, in particular a pipe and instrumentation diagram.

In general, MTPs cannot be used to fully represent all information of a process flow diagram. Using the extender unit, the process flow diagram is fully represented on the topology layer. This allows a complete representation of the process as defined in the process flow diagram using modular engineering techniques.

Preferably, the MTPs and the extender unit may be automatically extracted from the process flow diagram, in particular by a computer implemented extraction algorithm.

For example, a "System Control Diagram" in accordance with NORSOK Standard 1-005 is imported. This already includes logic in form of a pipe and instrumentation diagram. The extraction for example uses a special export format as AutomationML.

According to an aspect of the disclosure, a custom process topology comprises at least one MTP and at least one extender unit, as determined by a method, as described herein.

Thus, in a modular engineering tool, the custom process topology extends the known process topology by the at least one extender unit, allowing for a more detailed representation of the production process without significantly enhancing the complexity of the engineering task.

According to an aspect of the disclosure, a use of an extended control scheme, as determined by a method, as described herein, for controlling dynamic behaviour of the production process of an industrial modular plant is provided.

According to an aspect of the disclosure, a computer program is provided, comprising instructions which, when the program is executed by a computer, cause the computer to carry out the method, as described herein.

According to an aspect of the disclosure, a computer-readable data carrier is provided having stored there on the computer program, as described herein.

Embodiments of the present disclosure also relate to a computer program product including computer program code for controlling one or more processors of a device adapted to be connected to a communication network and/or configured to store a standardized configuration representation, particularly, a computer program product including a computer readable medium containing therein the computer program code.

In an embodiment, the functional modules and/or the configuration mechanisms are implemented as programmed software modules or procedures, respectively; however, one skilled in the art will understand that the functional modules and/or the configuration mechanisms can be implemented fully or partially in hardware.

BRIEF DESCRIPTION OF THE SEVERAL VIEWS OF THE DRAWING(S)

Figure 2:
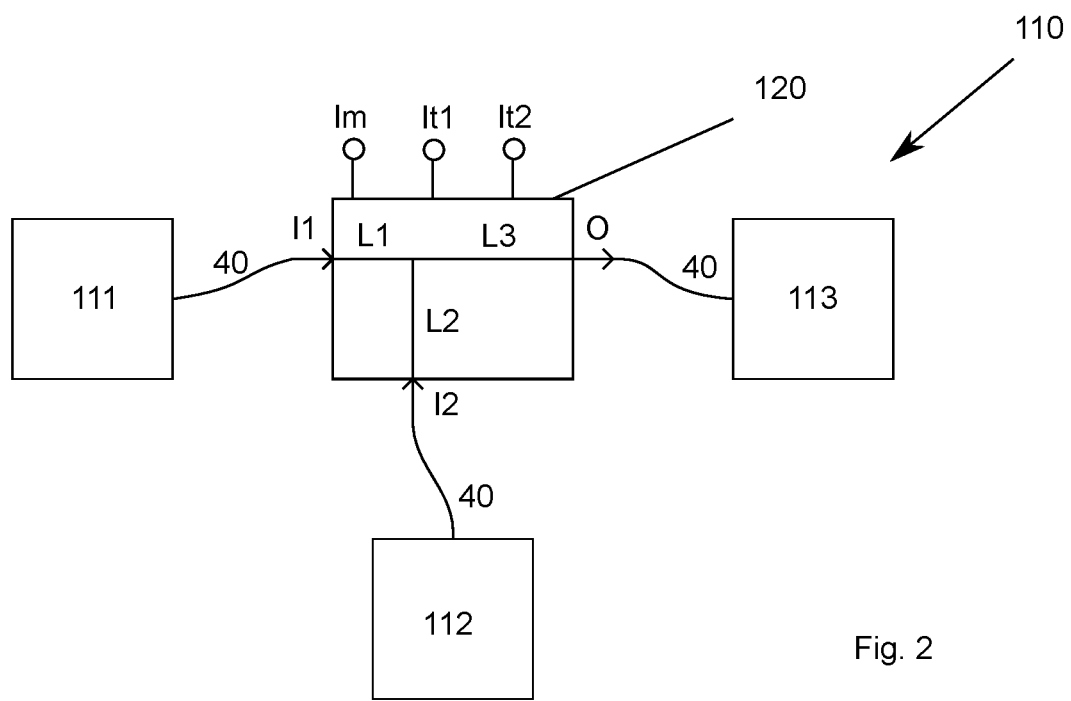
Figure 3:
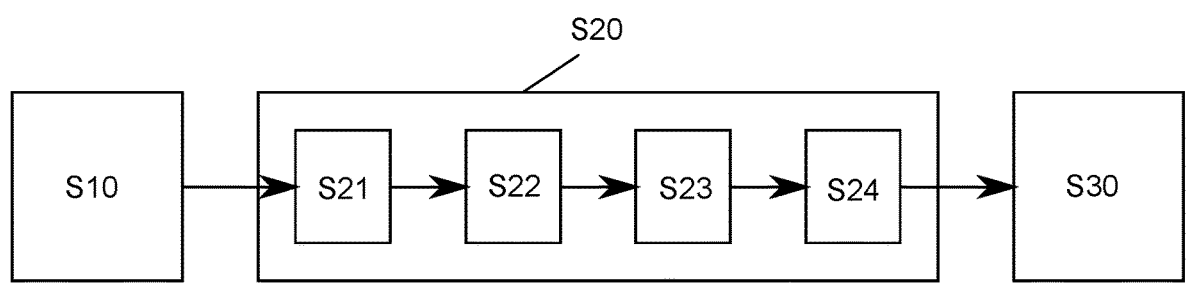

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 schematically shows a custom process topology according to a first embodiment;

FIG. 2 schematically shows a custom process topology according to a second embodiment; and FIG. 3 schematically shows a method for custom logic engineering of an industrial process topology.

The reference symbols used in the drawings, and their meanings, are listed in summary form in the list of reference symbols. In principle, identical parts are provided with the same reference symbols in the figures.

DETAILED DESCRIPTION OF THE INVENTION

FIG. 1 shows a schematical view of a custom process topology 10 according to a first embodiment. The custom process topology 10 relates to an industrial modular plant that will be configured for executing a production process. The industrial modular plant comprises at least one physical process module, for example a heating module, a mixing module or a cooling unit. In this case, the industrial modular plant to be controlled or to be design and controlled, comprises three physical process modules. MTPs for each physical process module are selected from a database based on corresponding process data. Consequently, a first MTP 11, a second MTP 12 and a third MTP 13 are selected.

In addition, to the MTPs 11, 12, 13, corresponding to the physical process modules of the industrial modular plant, two extender units, a first vMTP 20 and a dedicated logic function 30 are selected from the database based on the process data. The vMTP 20 represents a T-section of a pipe connecting the first MTP 11 and the third MTP 13. Consequently, the first MTP 11, the second MTP, the third MTP and the first vMTP 20 are connected with flow connectors CF in accordance with the process data. The flow connectors CF represent pipes, through which material is transported from one MTP or vMTP to another. As there is a T-section of the pipe between the physical process modules represented by the first MTP 11 and the third MTP 13, the first vMTP representing the T-section is connected by the flow connectors CF accordingly. The dedicated logic function 30 represents a logical AND gate. The dedicated logic function 30 connects the first MTP 11 and the second MTP 12 with the third MTP 13 by logic connectors CL. Thus, a logical relationship between logical signals of the three MTPs 11, 12, 13 can be engineered on the process topology level. Of course, the logic connectors CL also can connect any extender unit or MTP.

Thus, a custom process topology 10 is provided that extends the known process topology by the extender units 20, 30. Consequently, an extended control scheme for controlling dynamic behaviour of the production process can be determined using the custom process topology 10 and simple sequential function chart, SFC.

FIG. 2 schematically shows a custom process topology 110 according to a second embodiment. In this case, the custom process topology 110 describes a mixing module that physically comprises two dosing modules that are connected to a tank module through pipes, including a T-section. The two mixing modules are represented by a fourth MTP 111 and a fifth MTP 112. The tank module is represented by a sixth MTP 113. The three MTPs 111, 112, 113 are connected with each other by flow connecters, in this case smart connectors 40. The t-section is represented by a second vMTP 120. Compared to normal flow connectors, the smart connectors 40 offer additional properties, like a material flow. As indicated, the vMTP 120 provides logical functions related to the length of the different parts of the T-section. In this case, a first length L1 of the pipe coming from the fourth MTP 111 has a length of 1 meter, a second length L2 of the pipe coming from the fifth MTP 112 has a length of 2 meters and a third length L3 coming from the sixth MTP 113 has a length of 3 meters. The pipe lengths of the T-section are thus represented by the vMTP 120. The vMTP 120 comprises a first input I1 and a second input I2 for receiving the smart connectors 40. Consequently, the vMTP 120 comprises an output O, for connecting the vMTP 120 over a smart connector 40 with the sixth MTP 113. The vMTP 120 also provides two binary signals, an input trigger It1 and an input trigger It2 that can be used in the SFC as a trigger condition to start a dosing service. In the same way, a mixing input Im is provided enabling or disabling the mixing procedure realized by the pipes. In the SFC, the mixing service is triggered according to a process recipe of the production process, followed by a condition check on the trigger signals to start the dosing services of the dosing modules at the first input I1 and the second input I2.

This approach saves cost because instead of a complex process module, just a T-section can be used to realize a more demanding process recipe. Furthermore, no change of the dosing or tank process modules is needed. Lastly, the extended control scheme can be implemented using a standard SFC because from an engineer perspective, the particularities of the production process could be described using the standardized concept of process modules.

The inserted T-section will have effects, e.g., on the process recipe in the background so that is delays for example the dosing of one material in comparison to another to compensate for different pipe lengths from two dosing modules into the tank module.

FIG. 3 is a flowchart for a method for custom logic engineering in an industrial modular plant executing a production process, comprising the following steps. In a first step S10, process data for the production process using at least one physical process module is received. In a second step, S20 a custom process topology 10 is determined by the following steps. In a first sub step S21 at least one module type package, MTP, correlating to the at least one respective physical process module is selected from a database based on the received process data, wherein the module type package 11, 12, 13 is a digital representation of the respective physical process module. In a second sub step S22, at least one extender unit 20, 30, 40 is selected from the database based on the received process data, representing a logical function of the production process. In a third sub step S23, connections CL, CF between the at least one extender unit 20, 30, 40 and the at least one MTP 11, 12, 13 are selected. In a fourth sub step S24, properties of the at least one extender unit 20, 30, 40 are set based on the received process data.

In a third step S30, an extended control scheme for controlling dynamic behaviour of the production process using the determined custom process topology 10 is determined.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SYMBOLS 10 custom process topology
11 first MTP
12 second MTP
13 third MTP
20 first vMTP
30 dedicated logic function
40 smart connector
CF flow connector
CL logic connector
110 custom process topology
111 fourth MTP
112 fifth MTP
113 sixth MTP
120 second vMTP
I1 first input
I2 second input
O output
L1 first length
L2 second length
L3 third length
Im mixing input
It1 first input trigger
It2 second input trigger
S10 first step
S20 second step
S21 first sub step
S22 second sub step
S23 third sub step
S24 fourth sub step
S30 third step

The invention claimed is:

1. A method for custom logic engineering in an industrial modular plant executing a production process, comprising the steps:
    receiving process data for the production process using at least one physical process module;
    determining a custom process topology, by
        selecting, based on the received process data, at least one module type package, MTP, correlating to the at least one respective physical process module from a database, wherein the module type package is a digital representation of the respective physical process module;
        selecting at least one extender unit from the database based on the received process data, representing an extended control of the production process;
        determining connections between the at least one extender unit and the at least one MTP;
        setting properties of the at least one extender unit based on the received process data; and
    determining an extended control scheme for controlling dynamic behavior of the production process using the determined custom process topology, wherein the at least one extender unit comprises at least one virtual module type package, vMTP, modelling dynamic properties of multi-point material flow through passive equipment.

2. The method of claim 1, wherein the at least one extender unit comprises at least one dedicated logic function.

3. The method of claim 2, wherein the at least one logic function comprises logical gate functions and/or unit conversion.

4. The method of claim 1, wherein the at least one extender unit comprises at least one smart connector, modelling dynamic properties of material flow, and wherein the at least one smart connector is used for the connections between the at least one vMTP and the at least one MTP.

5. The method of claim 1, wherein the at least one extender unit is visualized and represented like the at least one MTP when determining the extended control scheme.

6. The method of claim 1, wherein the extended control scheme is determined in a process orchestration layer, POL, making the extended control of the production process visible.

7. The method of claim 6, further comprising the step of implementing the control scheme on the POL using a sequential flow chart, SFC.

8. The method of claim 1, further comprising the step of operating the modular plant using the control scheme.

9. The method of claim 1, wherein selecting the at least one extender unit comprises loading the at least one extender unit from a library and/or deriving the at least one extender unit from model data, in particular CAD-data.

10. The method of claim 1, wherein selecting the at least one extender unit comprises extracting the at least one extender unit from a process flow diagram, in particular a pipe and instrumentation diagram.

11. A non-transitory computer-readable medium having processor-executable instructions stored thereon, wherein the processor-executable instructions, when executed by one or more processors, facilitate:
  receiving process data for the production process using at least one physical process module;
  determining a custom process topology, by
    selecting, based on the received process data, at least one module type package, MTP, correlating to the at least one respective physical process module from a database, wherein the module type package is a digital representation of the respective physical process module;
    selecting at least one extender unit from the database based on the received process data, representing an extended control of the production process;
    determining connections between the at least one extender unit and the at least one MTP;
    setting properties of the at least one extender unit based on the received process data; and
  determining an extended control scheme for controlling dynamic behavior of the production process using the determined custom process topology, wherein the at least one extender unit comprises at least one virtual module type package, vMTP, modelling dynamic properties of multi-point material flow through passive equipment.

12. The non-transitory computer-readable medium of claim 11, wherein the at least one extender unit comprises at least one dedicated logic function.

13. The non-transitory computer-readable medium of claim 11, wherein the at least one logic function comprises logical gate functions and/or unit conversion.

14. The non-transitory computer-readable medium of claim 11, wherein the at least one extender unit comprises at least one smart connector, modelling dynamic properties of material flow, and wherein the at least one smart connector is used for the connections between the at least one vMTP and the at least one MTP.

15. The non-transitory computer-readable medium of claim 11, wherein the at least one extender unit is visualized and represented like the at least one MTP when determining the extended control scheme.

16. The non-transitory computer-readable medium of claim 11, wherein the extended control scheme is determined in a process orchestration layer, POL, making the extended control of the production process visible.

17. The non-transitory computer-readable medium of claim 16, wherein the processor-executable instructions, when executed by the one or more processors, facilitate at least one of:
  implementing the control scheme on the POL using a sequential flow chart, SFC; and
  operating the modular plant using the control scheme.

18. The non-transitory computer-readable medium of claim 11, wherein selecting the at least one extender unit comprises at least one of:
  loading the at least one extender unit from a library and/or derive the at least one extender unit from model data, in particular CAD-data; and
  extracting the at least one extender unit from a process flow diagram, in particular a pipe and instrumentation diagram.

* * * * *